United States Patent

Miller et al.

[11] Patent Number: 5,855,772
[45] Date of Patent: Jan. 5, 1999

[54] FUEL FILTER AND WATER SEPARATOR APPARATUS WITH HEATER

[75] Inventors: Paul D. Miller; Keith Lilly; Bill Hedgecough; A. Caner Demirdogen; Zemin Jiang, all of Cookeville, Tenn.

[73] Assignee: Fleetguard, Inc., Nashville, Tenn.

[21] Appl. No.: 742,631

[22] Filed: Nov. 1, 1996

[51] Int. Cl.$^6$ .................................................. B01D 35/18
[52] U.S. Cl. ........................... 210/86; 210/149; 210/184; 210/249; 210/313; 210/438; 210/454; 210/493.2
[58] Field of Search .............................. 210/86, 149, 184, 210/185, 187, 313, 438, 454, 457, 249, 493.2; 219/205, 505; 392/485, 491, 492; 137/588, 625.18; 251/263

[56] References Cited

U.S. PATENT DOCUMENTS

| | | | |
|---|---|---|---|
| 2,046,474 | 7/1936 | Maggenti | 137/588 |
| 3,104,089 | 9/1963 | Seltsam | 251/263 |
| 3,473,666 | 10/1969 | Humbert, Jr. . | |
| 4,298,465 | 11/1981 | Druffel . | |
| 4,321,136 | 3/1982 | Matsui . | |
| 4,372,847 | 2/1983 | Lewis | 210/86 |
| 4,387,691 | 6/1983 | Marcoux et al. . | |
| 4,406,785 | 9/1983 | Siefer . | |
| 4,437,986 | 3/1984 | Hutchins et al. . | |
| 4,477,345 | 10/1984 | Szlaga, Jr. . | |
| 4,502,955 | 3/1985 | Schaupp . | |
| 4,510,051 | 4/1985 | Diry | 210/185 |
| 4,529,866 | 7/1985 | Leary | 210/184 |
| 4,580,542 | 4/1986 | Kawabata . | |
| 4,596,224 | 6/1986 | Prager . | |
| 4,600,825 | 7/1986 | Blazejovsky | 219/205 |
| 4,608,161 | 8/1986 | Niemeier . | |
| 4,836,923 | 6/1989 | Popoff et al. | 210/454 |
| 4,997,555 | 3/1991 | Church et al. . | |
| 5,084,170 | 1/1992 | Janik et al. | 210/438 |
| 5,244,571 | 9/1993 | Church et al. . | |
| 5,458,767 | 10/1995 | Stone | 210/438 |
| 5,589,060 | 12/1996 | Gerbert et al. | 210/457 |

*Primary Examiner*—Matthew O. Savage
*Attorney, Agent, or Firm*—Woodard, Emhardt, Naughton Moriarty & McNett

[57] ABSTRACT

A fuel filter constructed and arranged with a heater and designed for fuel-water separation includes a unitary housing (casting) which has an open top to be closed by a threaded lid and a closed base which in combination with a surrounding sidewall defines an interior space. A fuel filter cartridge including a filter element, centertube, and top and bottom endplates is disposed in the interior space such that there is a water collection space between the bottom endplate and the closed base of the housing. The lid includes a plurality of snap-fit fingers arranged in an annular array for press-on attachment to the top endplate. A heater ring is provided within the housing and is positioned around the filter cartridge. The heater ring provides both a flow path for entering fuel and a plurality of positive-temperature-coefficient stones which assist in the heating of the fuel. Control of the heater ring is provided by a heater connector and thermostat combination. The thermostat senses the temperature of the housing near the heater ring and is designed to provide an open circuit when the designed temperature is exceeded. A drain valve is mounted to the housing in flow communication with the water collection space and is operated by a manual lever which controls the movement of a spring-biased plunger. A water-in-fuel sensor is mounted to the housing and extends into the water collection space for deriving conductivity readings.

16 Claims, 14 Drawing Sheets

FUEL FILTER AND WATER SEPARATOR APPARATUS WITH HEATER

BACKGROUND OF THE INVENTION

The present invention relates in general to fuel filters which incorporate a water separation and collection feature in combination with a heater. More specifically the present invention relates to fuel filters which include a variety of features which are intended to provide a design which is convenient to use and to service and which is cost effective to manufacture.

Diesel fuel tends to contain a relatively high level of impurities such as particulate matter and water as compared to the corresponding levels in other liquid hydrocarbon fuels. As a consequence, diesel fuel typically needs to be filtered before injecting the diesel fuel into the engine. The concern over the levels of particulate matter and water in the diesel fuel are significant due to the problems which can be caused. Particulate matter can clog fuel lines and fuel injectors and cause deposits to be formed in the combustion chamber. When water-laden diesel fuel is run through a fuel system and engine, the presence of water can cause the fuel injection system to malfunction due to rust, corrosion, deposits, etc. Excessive levels of water may lead to catastrophic injector nozzle failure due to the effects of steam expansion and/or lubricity effects.

In cold weather, diesel fuel becomes more viscous and, as a result, flows through the fuel system more slowly. Due to the presence of water in the diesel fuel, there is a higher probability of fuel line freeze. Even if the fuel does not freeze in the fuel line, the higher viscosity, due to the fuel gelling, will cause the fuel filter to restrict the flow therethrough. The problems of the fuel gelling and increased viscosity are complicated by having an increased amount of water in the fuel. If there is insufficient fuel reaching the combustion chamber, the engine will be starved and, as a result, will not run or will not run efficiently.

In order to address the issue of water-laden fuel and fuel viscosity in cold weather, fuel filters have been designed with water separation and collection arrangements and with heaters. In one arrangement, the water and other contaminants in the diesel fuel are collected on the outer surface of the filter medium and from there, drop to the bottom portion of the housing and are collected in a suitable collection bowl. In another arrangement, a centrifugal flow path is used to separate the higher density fluid (i.e., water and particulate matter) from the lower density fuel.

With regard to the addition of a heater, heater devices used in combination with diesel fuel filters have become accepted due to the successful results which have been achieved. Initially, the heaters were adapted to preexisting fuel filters, but now it has become common to incorporate the heater as an integral, although modular, part of the fuel filter package. The use of a heater achieves an efficient degree of heat transfer with the fuel.

While the enhancements of water separation and the addition of a heater are significant, a number of other considerations are introduced by these two enhancements. For example, what path should the fuel follow for proper heating of the fuel? What style of thermostat should be used and where should it be installed in order to control the temperature? What style of housing is preferred and what is the easiest way to install and replace the filter element? These are only some of the questions which need to be answered when designing a fuel filter with the water separation capability and with a heater. The specific style of heater is also a consideration as is the method of draining the collection bowl. Some of these considerations have been the subject of issued patents and the following listing is believed to be a representative sampling of these earlier design efforts:

| PATENT NO. | PATENTEE | ISSUE DATE |
|---|---|---|
| 3,473,666 | Humbert, Jr. | Oct. 21, 1969 |
| 4,298,465 | Druffel | Nov. 3, 1981 |
| 4,321,136 | Matsui | Mar. 23, 1982 |
| 4,406,785 | Siefer | Sep. 27, 1983 |
| 4,437,986 | Hutchins et al. | Mar. 20, 1984 |
| 4,477,345 | Szlaga, Jr. | Oct. 16, 1984 |
| 4,502,955 | Schaupp | Mar. 5, 1985 |
| 4,580,542 | Kawabata | Apr. 8, 1986 |
| 4,997,555 | Church, et al. | Mar. 5, 1991 |
| 5,244,571 | Church, et al. | Sep. 14, 1993 |
| 4,387,691 | Marcoux, et al. | Jun. 14, 1983 |
| 4,596,224 | Prager | Jun. 24, 1986 |
| 4,608,161 | Niemeier | Aug. 26, 1986 |

Even with all of the design variations and features which have heretofore been invented, there are other improvements and enhancements which have not, prior to the present invention, either been offered as part of a fuel filter or combined with a number of other features and enhancements into one cooperating assembly. Improvements in the housing design, the drain valve, the lid and filter cartridge relationship, and the water-in-fuel sensor are all incorporated into the present invention in a novel and unobvious manner. Further, a novel and unobvious heater ring is incorporated as part of the fuel filter according to the present invention and this provides benefits as to heating of the fuel and separation of the water from the fuel. The overall result from the present invention is an improvement in the service method, an improvement in the compact design, and an improvement in the cost effectiveness of the fuel filter design.

SUMMARY OF THE INVENTION

A fuel filter constructed and arranged for fuel-water separation according to one embodiment of the present invention comprises a unitary housing, a fuel filter, a unitary lid, a heater ring, a heater connector and thermostat assembly, a drain valve, and a water-in-fuel sensor. The unitary housing includes an open top and a closed base and extending therebetween a sidewall which in combination with the closed base defines a hollow interior space. Extending up from the closed base is a support post which receives a permanent centertube for mounting and alignment of the fuel filter cartridge. The fuel filter cartridge is disposed within the interior space and includes a filter element, a centertube, a top endplate bonded to one end of the filter element and a bottom endplate bonded to the opposite end of the filter element. The bottom endplate is spaced apart from the closed base of the housing and defines therebetween a water collection space. The unitary lid is constructed and arranged for threaded attachment to the housing for closing the open top. The lid includes a plurality of snap-fit fingers for press-on attachment to the top endplate. The heater ring is mounted into the housing and is positioned around the filter cartridge. The heater ring includes a plurality of Positive-Temperature-Coefficient (PTC) stones and is arranged with a flow path for receiving entering fuel. The heater connector which is combined with a thermostat is electrically connected to the heater ring in order to control the delivery of power to the heater ring and maintain a desired temperature. The drain valve is mounted directly to the housing and in cooperation with the housing defines a flow passage, allowing water which is collected within the water collection space to be vented from the housing by way of the drain valve. The water-in-fuel (WIF) sensor is mounted to the housing and the electrical contacts extend into the water collection space for deriving conductivity readings.

One object of the present invention is to provide an improved fuel filter assembly.

Related objects and advantages of the present invention will be apparent from the following description.

DESCRIPTION OF THE PREFERRED EMBODIMENT

Figure 1:
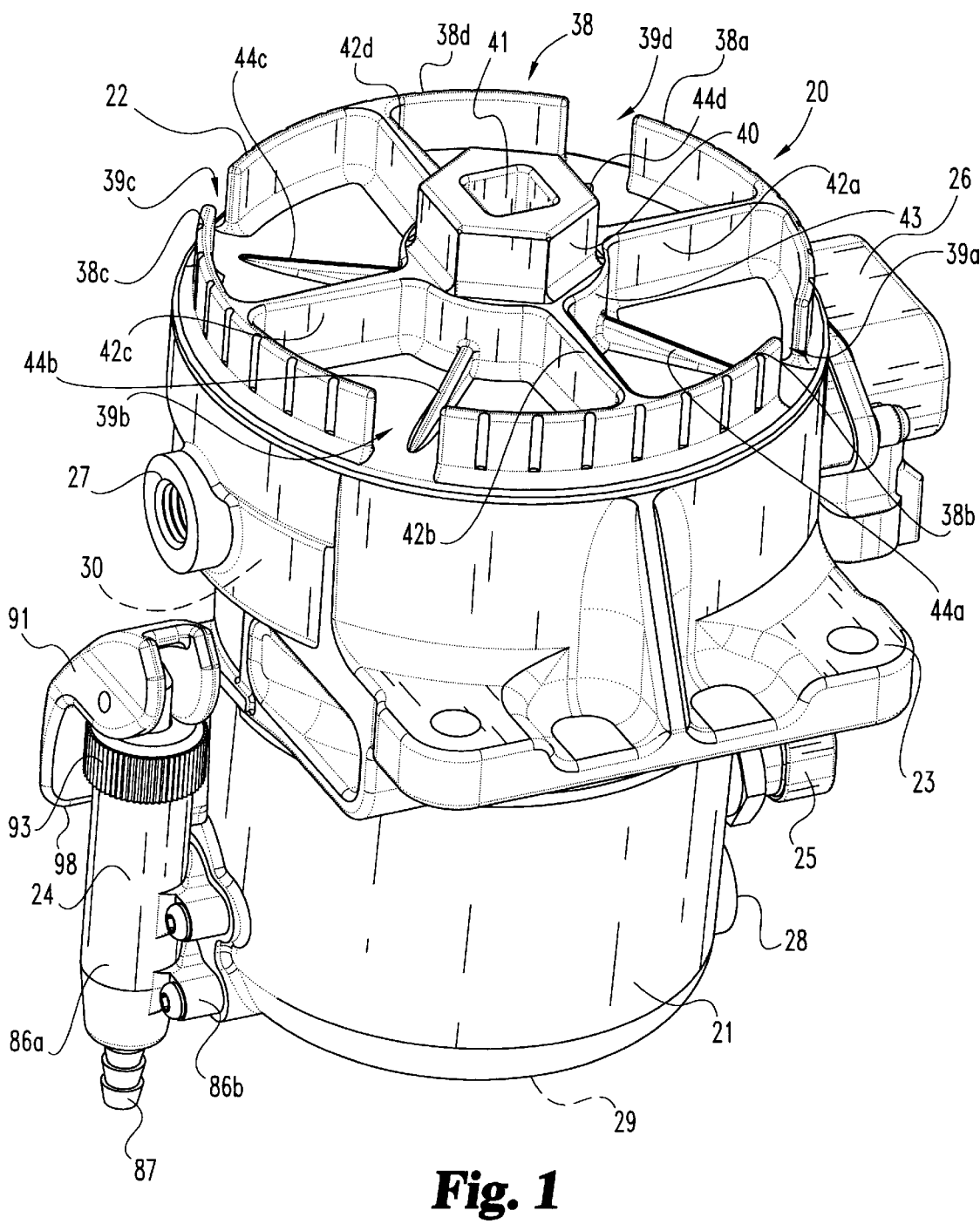
FIG. 1 is a perspective view of a fuel filter according to a typical embodiment of the present invention.
Figure 2:
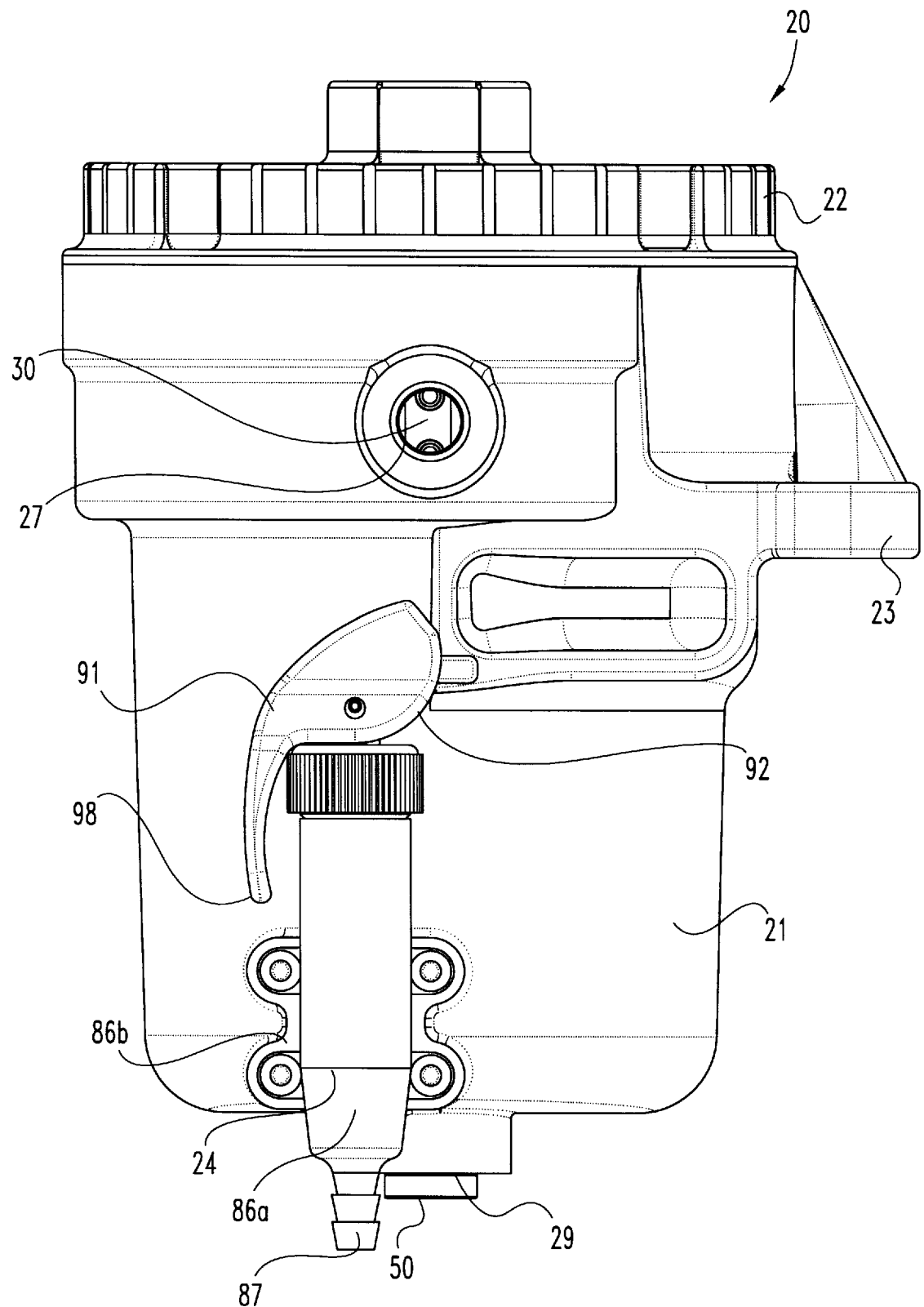
FIG. 2 is a front elevational view of the FIG. 1 fuel filter.
Figure 3:
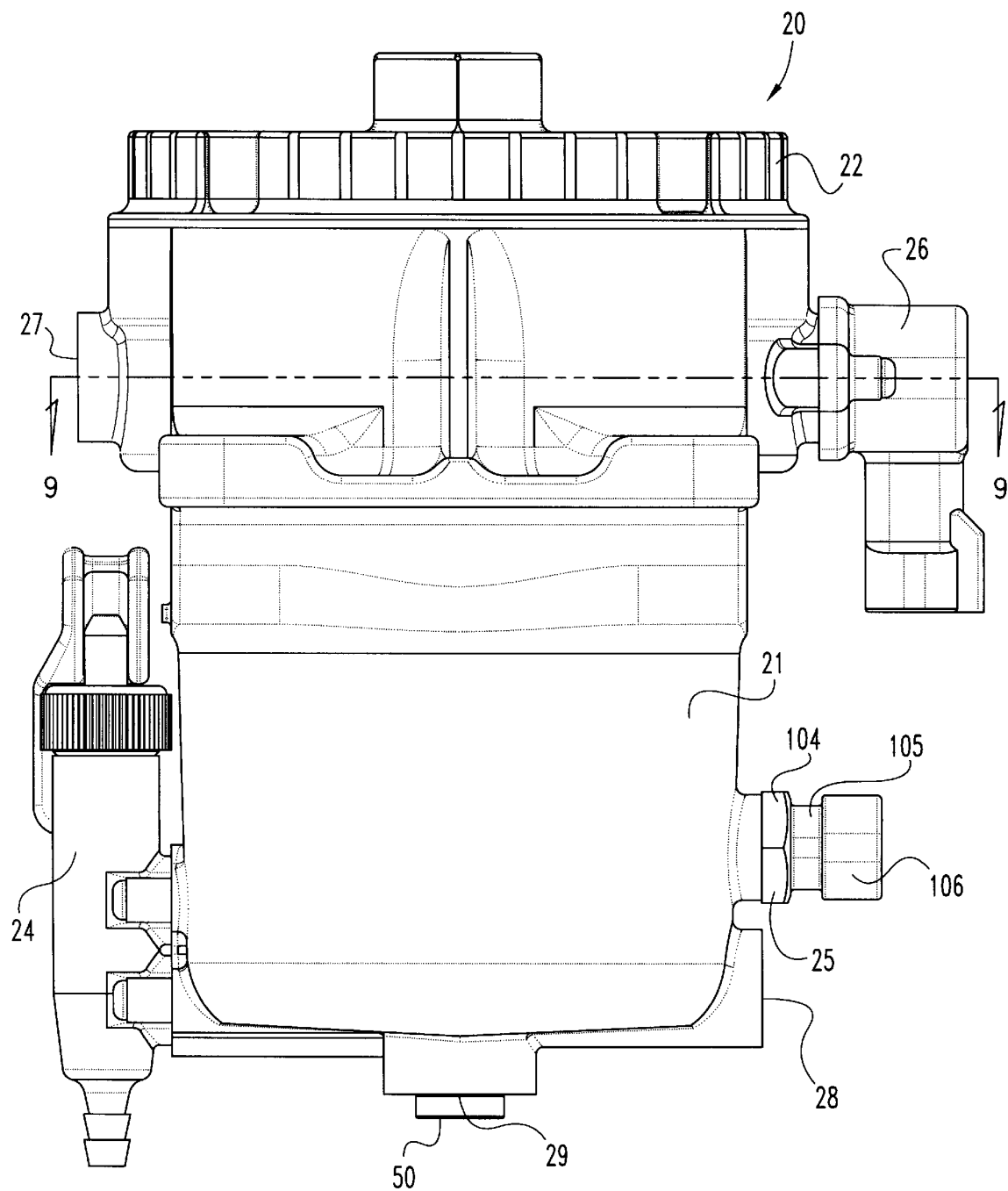
FIG. 3 is a right side elevational view of the FIG. 1 fuel filter.
Figure 4:
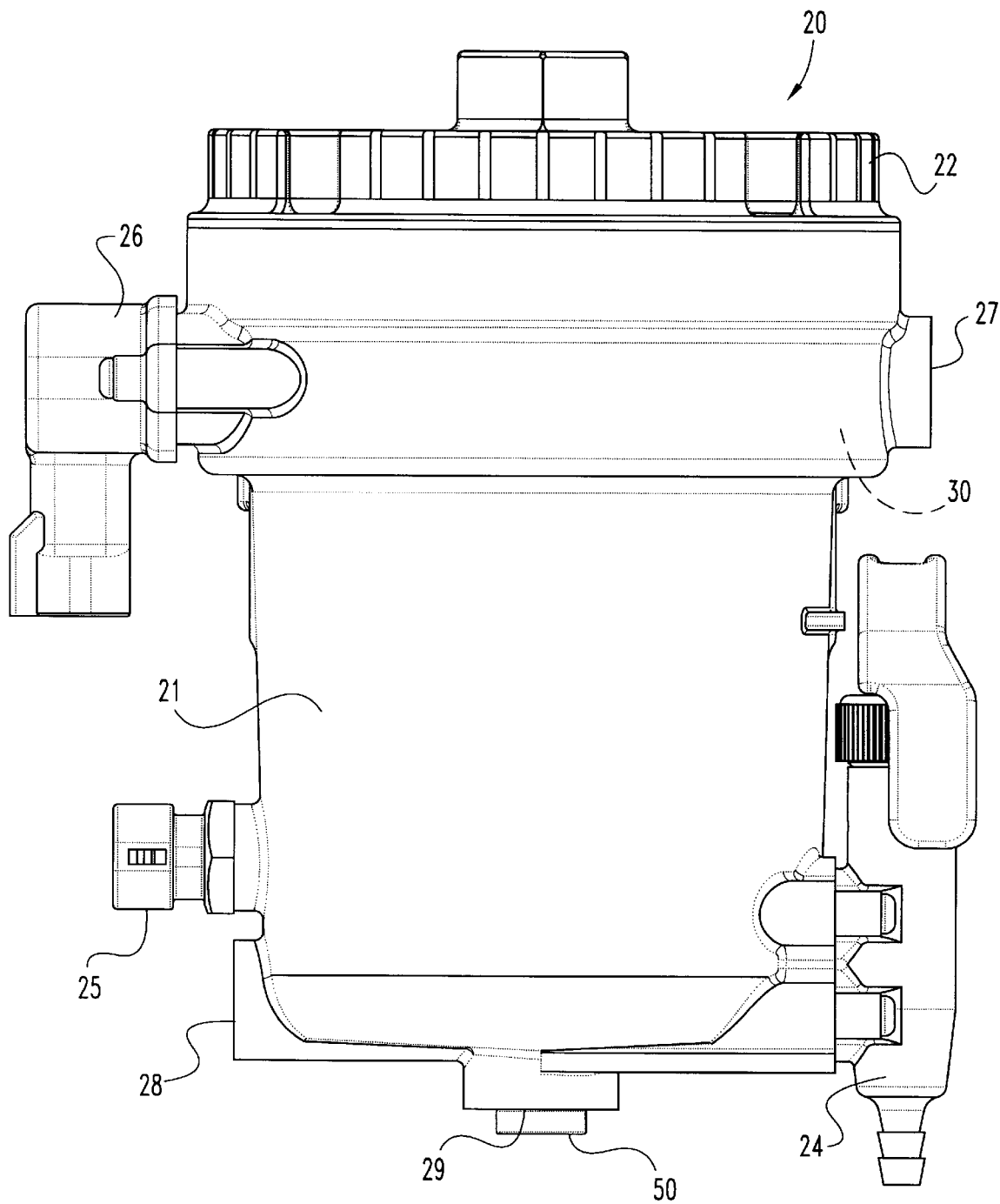
FIG. 4 is a left side elevational view of the FIG. 1 fuel filter.
Figure 5:
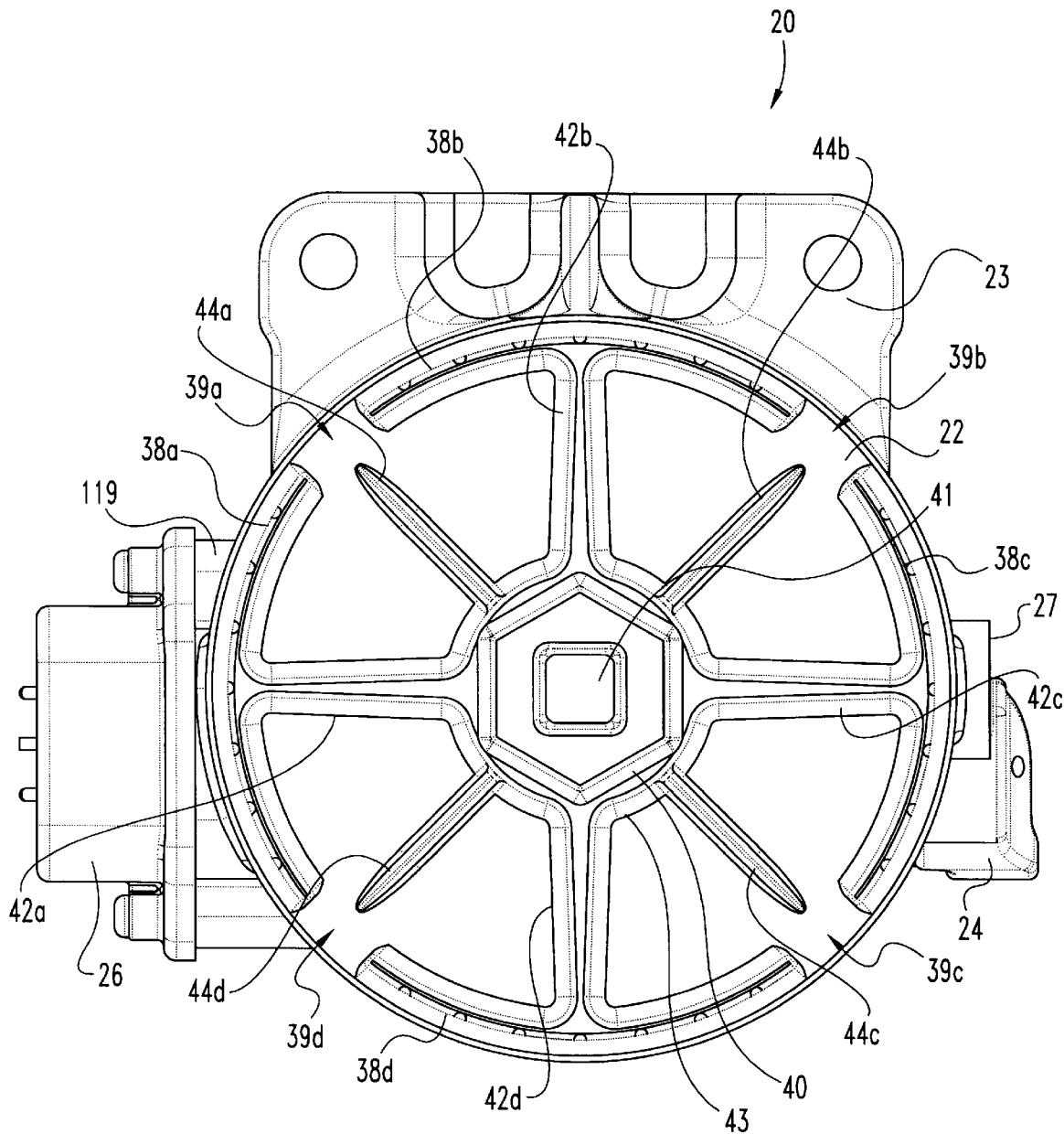
FIG. 5 is a top plan view of the FIG. 1 fuel filter.
Figure 6:
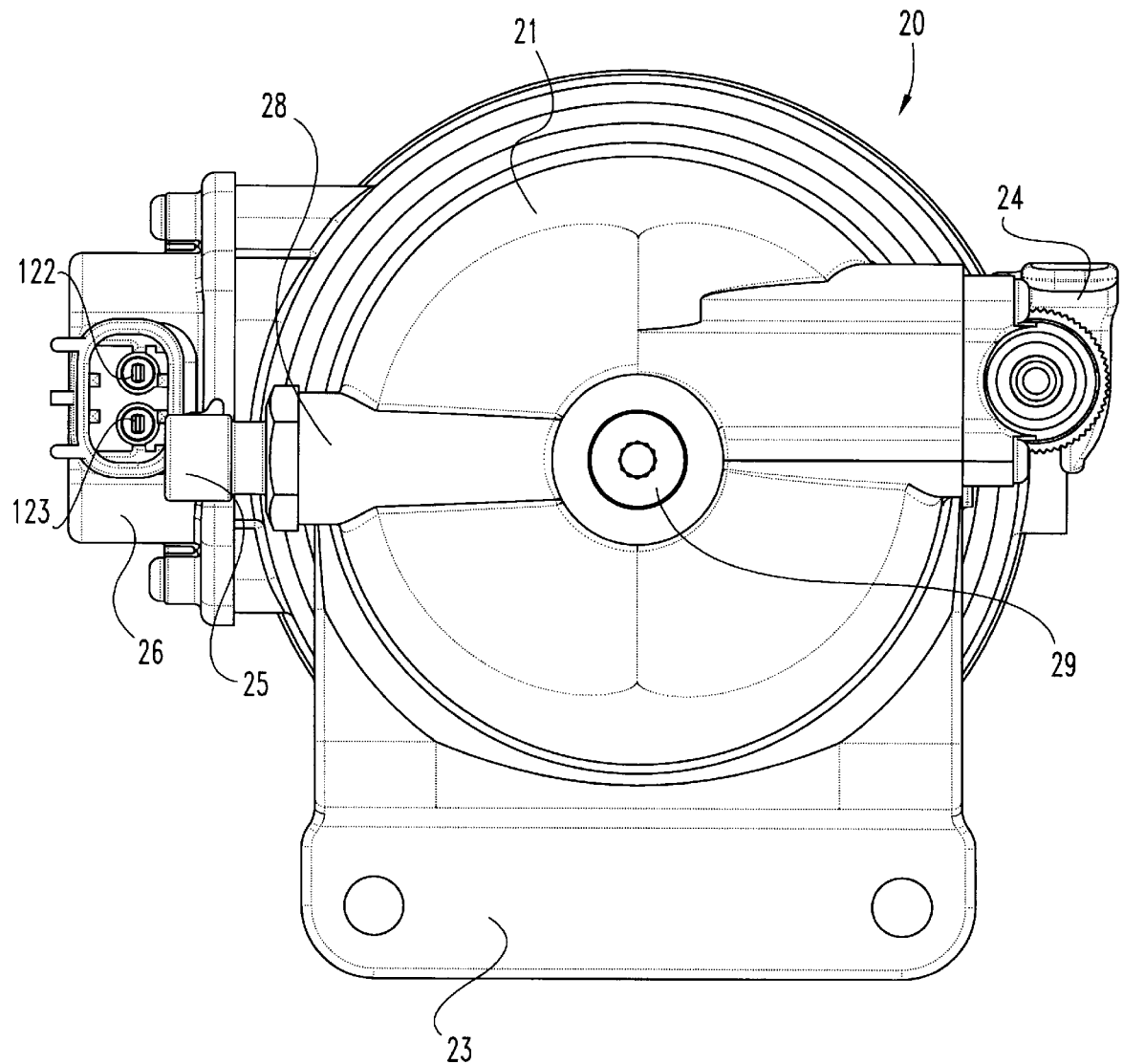
FIG. 6 is a bottom plan view of the FIG. 1 fuel filter.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 8:
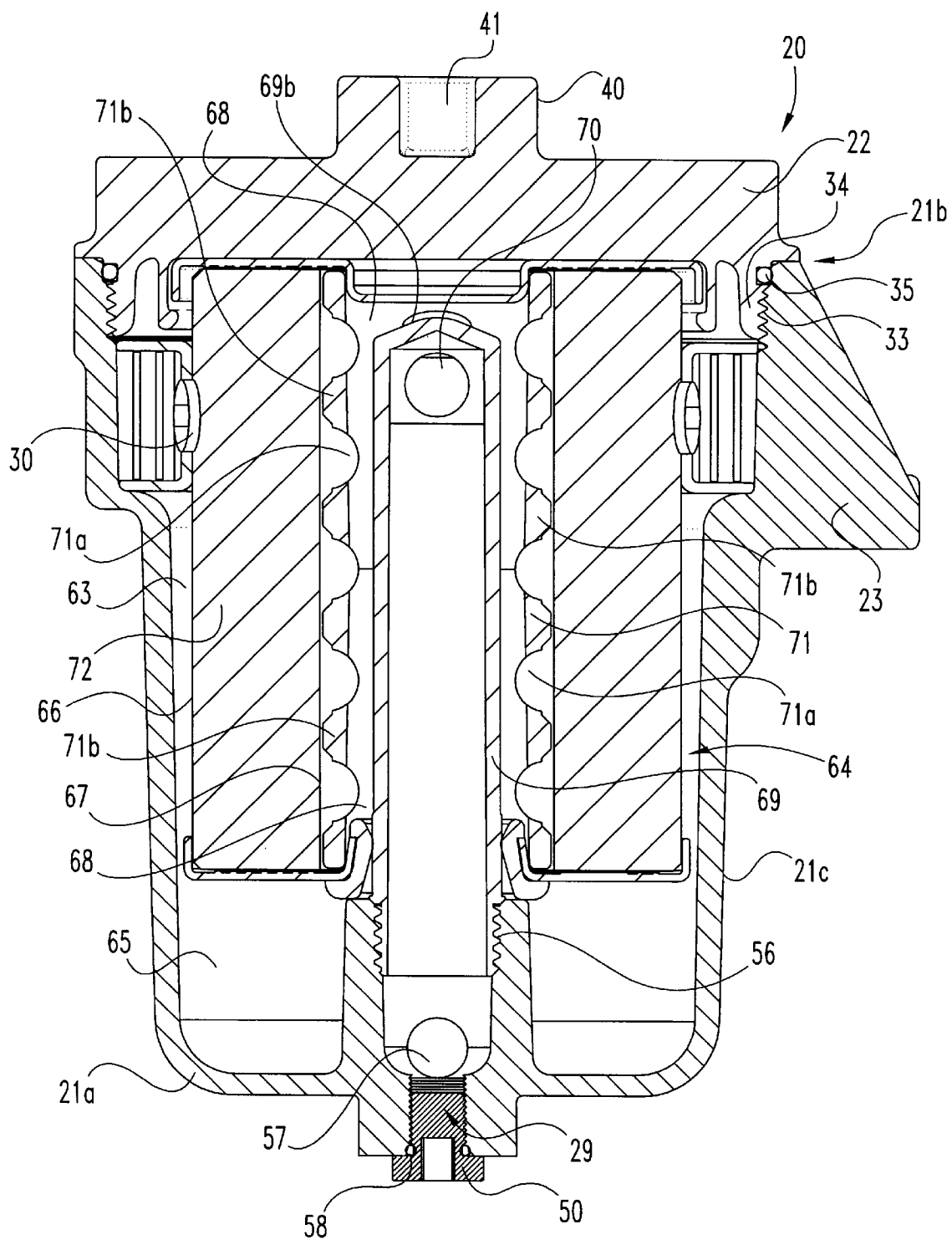
FIG. 8 is a diagrammatic, front elevational view in full section of the FIG. 1 fuel filter.
Figure 9:
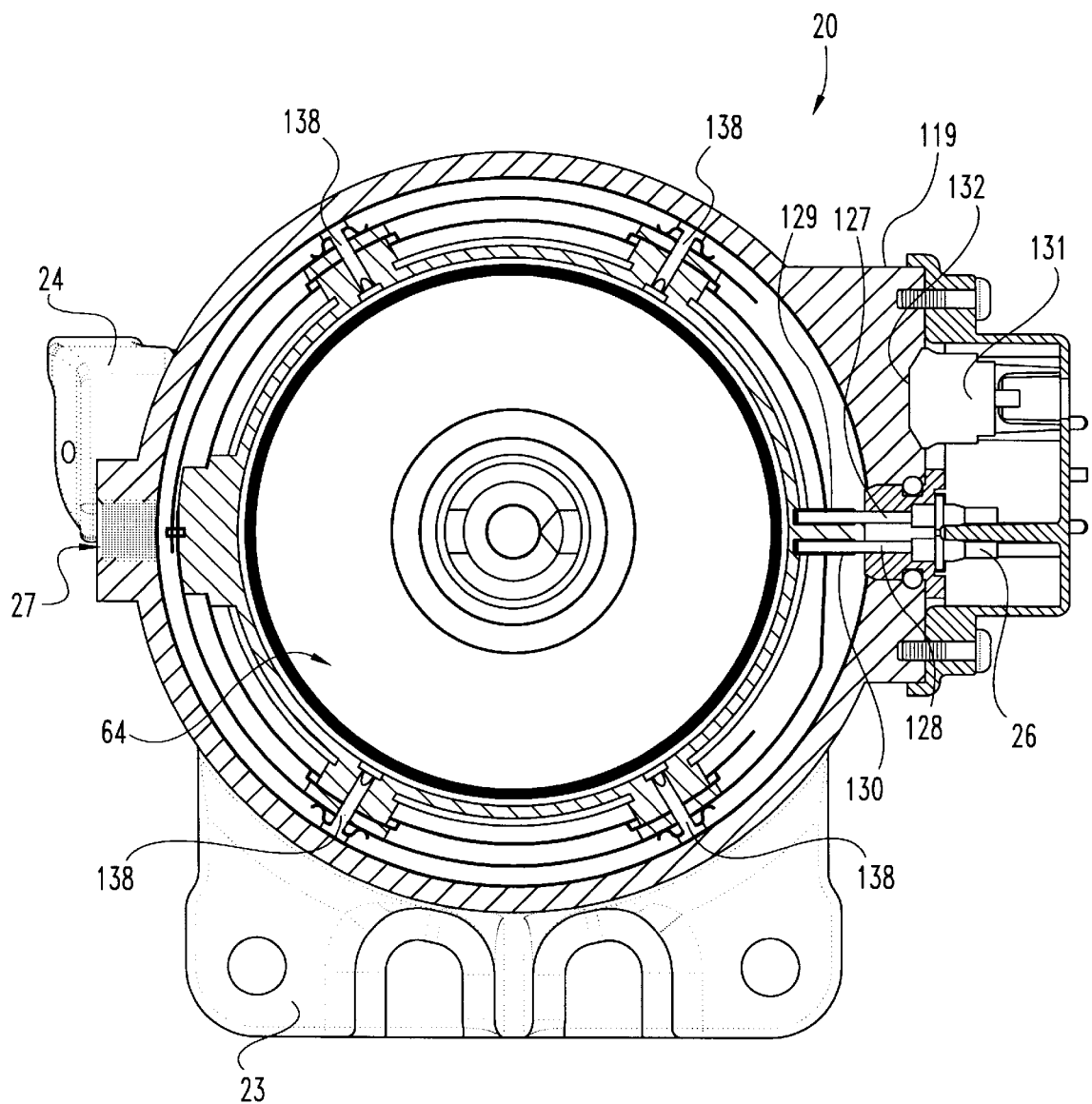
FIG. 9 is a top plan view in full section of the FIG. 1 fuel filter as viewed along cutting plane line 9—9 in FIG. 3.
Figure 10:
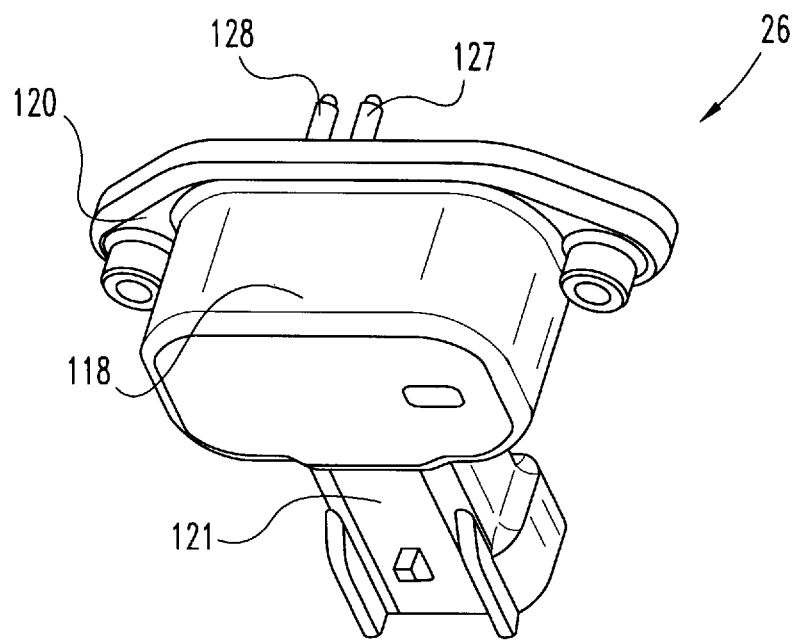
FIG. 10 is a perspective view of a heater connector/thermostat assembly which comprises a portion of the FIG. 1 fuel filter according to the present invention.
Figure 11:
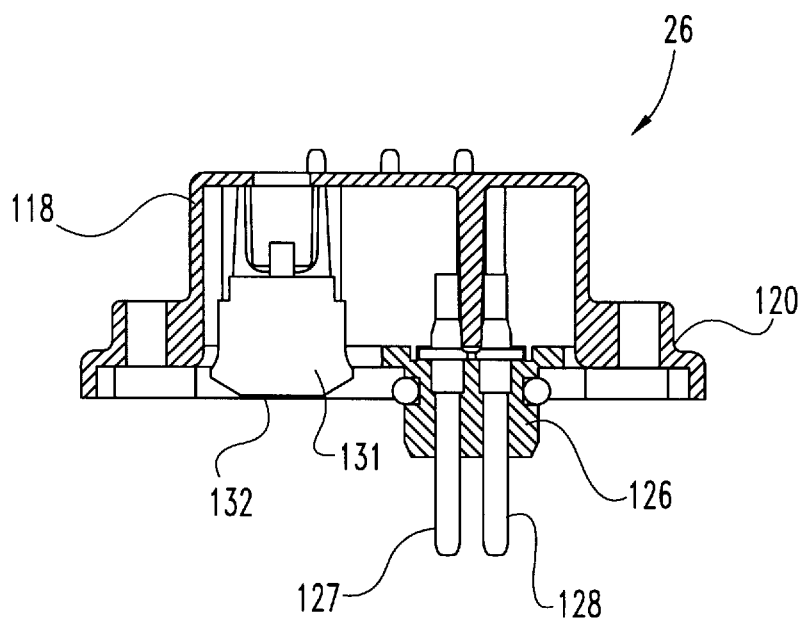
FIG. 11 is a side elevational view in full section of the FIG. 10 heater connector/thermostat assembly.
Figure 12:
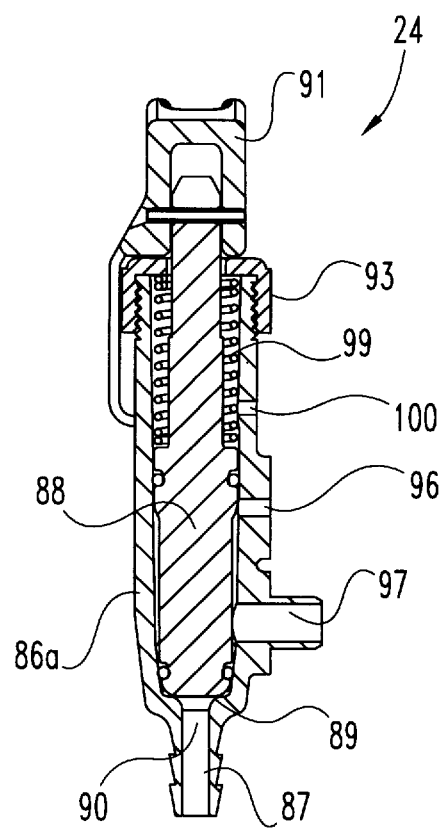
FIG. 12 is a side elevational view in full section of a drain valve comprising a portion of the FIG. 1 fuel filter.
Figure 13:
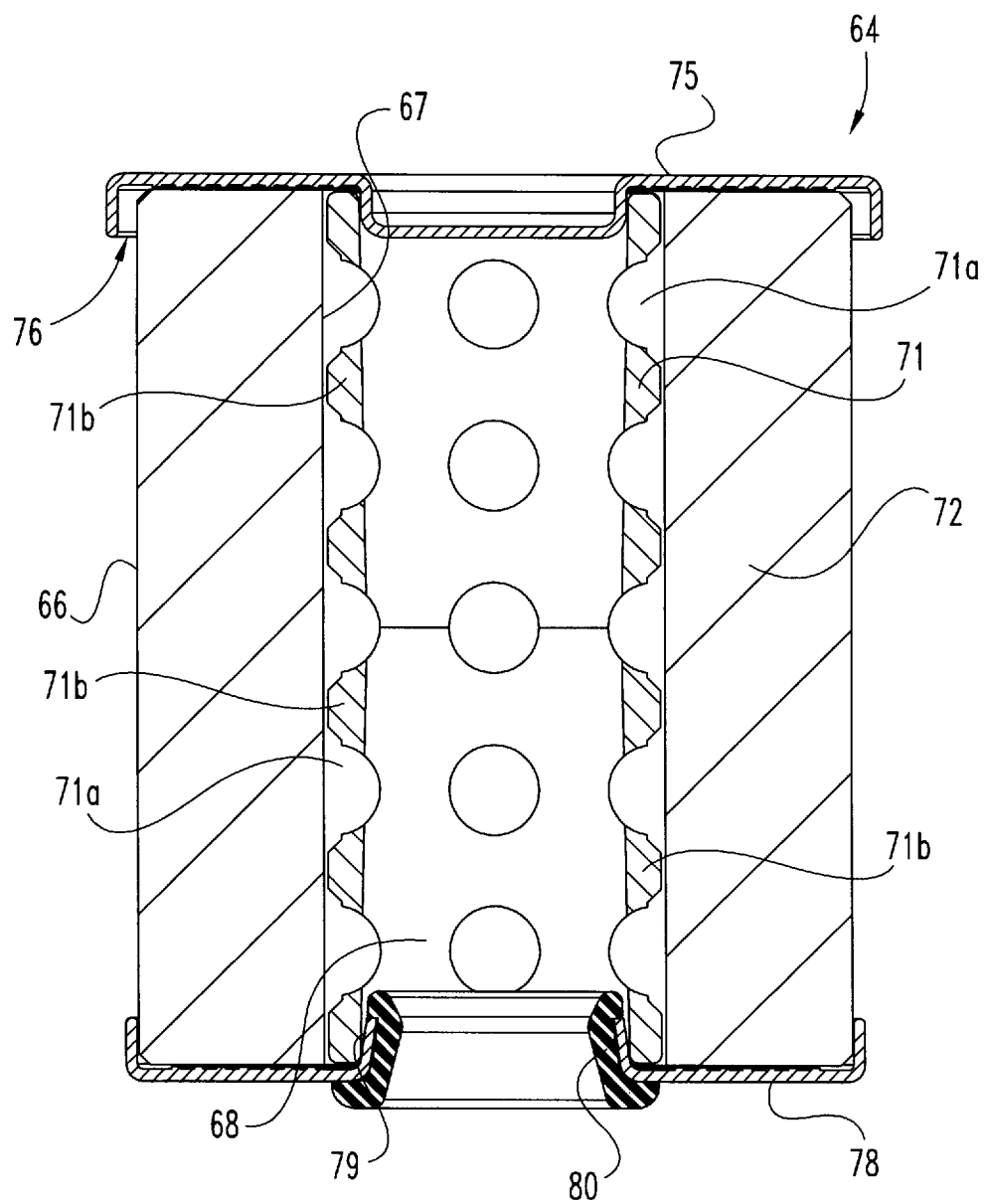
FIG. 13 is a front elevational view in full section of a filter element with endplates and centertube and comprising a portion of the FIG. 1 fuel filter.

Referring to FIGS. 1–6, a fuel filter 20 which is designed in accordance with the present invention is illustrated. The exterior of fuel filter 20, including its assembled components, is illustrated in these drawing figures. The interior structure of fuel filter 20 is illustrated in drawing FIGS. 7–9. Detailed illustrations of the assembled components which comprise part of fuel filter 20 are provided in drawing FIGS. 10–15.

Fuel filter 20 includes a main housing 21, a lid 22, mounting bracket 23, drain valve 24, water-in-fuel (WIF) sensor 25, heater connector/thermostat assembly 26, fuel inlet 27, fuel outlet 28, downstream diagnostic port 29, and heater ring 30 which is hidden from view. The orientation of fuel filter 20 in FIGS. 1–6 shall be used as a reference for the description which follows such that the filter has a "top" and a "bottom" as well as "upper" and "lower" directions. However, in actual use the fuel filter can be mounted by way of mounting bracket 23 in virtually any orientation. Nevertheless, the use of a water collection space at the bottom of the housing and a drain valve connected to that water collection space indicates that the preferred orientation for fuel filter 20, in actual use, is the orientation which is illustrated herein. As would be understood, and as mentioned above, diesel fuel often contains a higher proportion of water than other liquid hydrocarbon fuels. Accordingly, within the fuel filter it is desirable to route the fuel in such a manner so as to allow the water to separate out from the fuel which can be facilitated by a number of techniques which have been already mentioned. Due to the different densities, the water will tend to collect below the fuel and thus a water collection space at the bottom of the filter element provides a suitable area for water collection. Once the amount of water reaches a certain level, it would be appropriate to drain that area of the water and thus a drain is provided as well as a WIF sensor.

Figure 7:
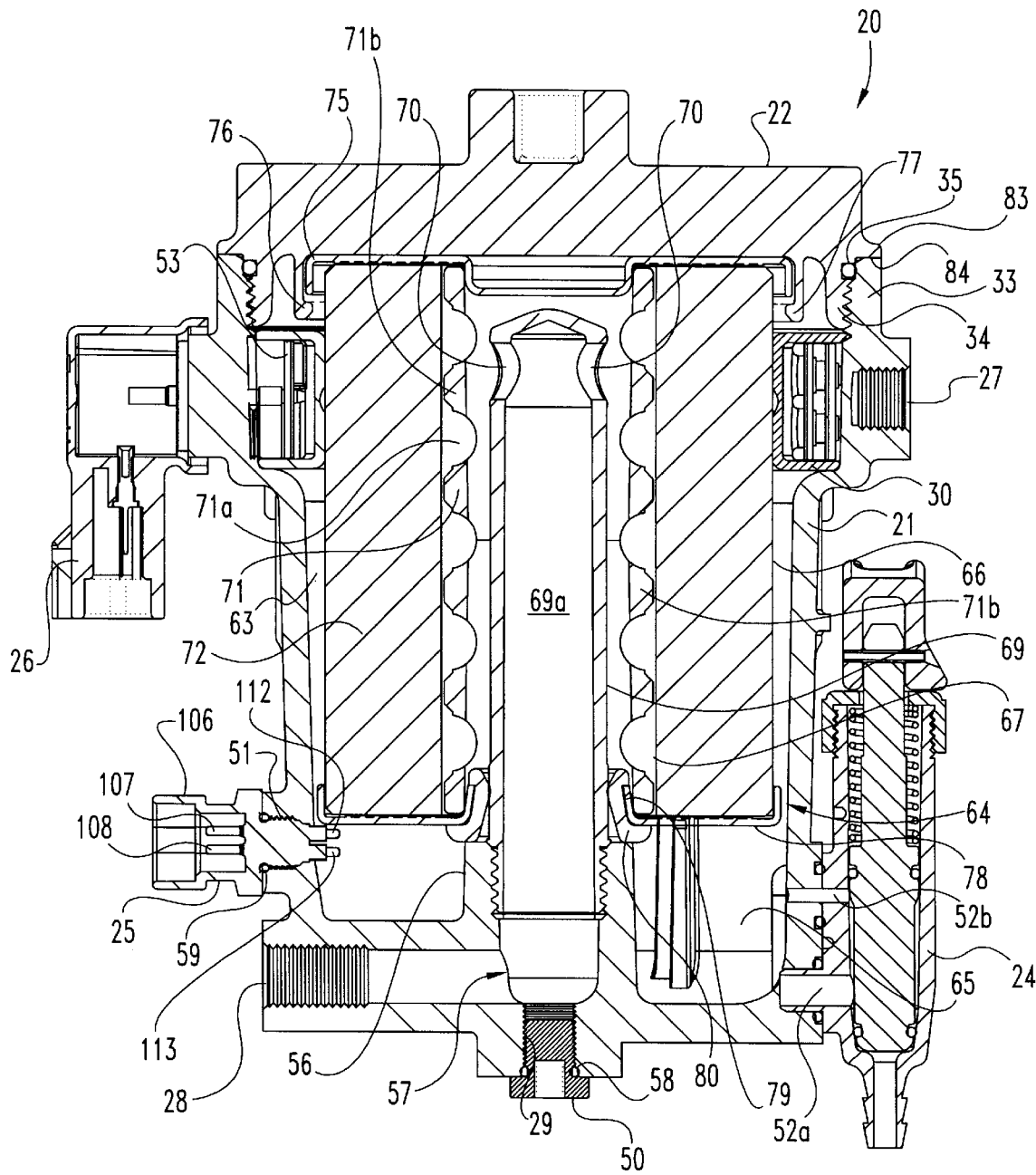
FIG. 7 is a left side elevational view in full section of the FIG. 1 fuel filter.

The upper edge 33 of housing 21 is internally threaded with a series of threads and the lower edge 34 of lid 22 is externally threaded with a series of cooperating threads (see FIG. 7). An O-ring 35 is positioned between the housing 21 and lid 22 above the cooperating threads in order to securely seal the interface between the housing and lid and prevent any fluid leakage. The lid 22 is designed to permit a number of different assembly and removal techniques and the use of various tools in order to assemble the lid into the housing and remove the lid from the housing. The upper, outer wall 38 of lid 22 is arranged into four part-cylindrical wall sections 38a–38d, each of which is separated from the adjacent wall section by a debris drain slot 39a–39d. The four wall sections 38a–38d are virtually identical and are equally spaced around the periphery of lid 22. The four drain slots 39a–39d are likewise equally spaced around the periphery of the lid. The center of lid 22 is configured with a hex post 40 which includes a recessed square drive socket 41 in the center of hex post 40. Each wall section 38a–38d is integrally connected to one of four, equally-spaced and cooperating long ribs 42a–42d, respectively, and each long rib connects to an inner, lower wall 43. Also connected to inner, lower wall 43 are four, equally-spaced short ribs 44a–44d. The centerline axis of each long rib 42a–42d is approximately 45 degrees from the centerline axis of each short rib 44a–44d.

The two sets of ribs can be used to manually thread the lid 22 into the housing 21 and, depending on the degree of tightening, manually remove the lid. Since the lid needs to be tightly assembled in order to be fluid-tight, the manual handling of the lid to either assemble or remove it is expected to be only part of the procedure. Manually the lid can be initially advanced and then securely tightened into final position by use of a hex socket wrench or by the use of a square drive wrench. The socket wrench or square drive wrench is then initially used to break the seal and, when the lid is loose enough by this means, its actual removal can be completed manually. The ribs can also be used in cooperation with a blunt tool driven by a mallet, to create a tight seal and/or to break the seal when the lid is to be removed.

The housing 21 is a unitary casting configured as a single member with integral mounting bracket 23. The mounting bracket 23 is cast as part of the housing, thereby providing not only a cost effective design but greater strength and rigidity. The housing 21 is also configured with a unitary, internally-threaded aperture for the fuel inlet 27, a unitary, internally-threaded aperture for the fuel outlet 28, an internally-threaded port 29 for receipt of a downstream diagnostic plug 50, an internally-threaded connection port 51 for the WIF sensor 25, a pair of connection ports 52a (inlet) and 52b (vent) for the drain valve 24, and a connection port 53 for the heater connector/thermostat assembly 26. The fuel inlet (port) 27 is located adjacent the open top end 21b of the housing so as to create an efficient fuel-water-separation path.

The interior of housing 21 (see FIGS. 7 and 8) is arranged with a unitary, internally-threaded support stem 56 which is centered in the closed base 21a of the housing and extends upwardly into the hollow interior of the housing in the direction of the open end 21b of the housing which is ultimately closed by lid 22. Disposed between closed base 21a and open end 21b is a surrounding sidewall 21c. Sidewall 21c in cooperation with the closed base 21a defines the hollow interior of the housing 21. Stem 56 is substantially concentric with the downstream diagnostic port 29 and the interior of stem 56 is in flow communication with port 29. Outlet hole 57 is the inner opening of fuel outlet port 28. Diagnostic plug 50 is threaded into port 29 and is threaded into a liquid-tight position, assisted by O-ring 58. Removal of plug 50 allows a portion of the fuel to be drawn off and diagnosed. The draw off of fuel by way of port 29 enables a "downstream" fuel diagnosis as would be understood from the location of port 29 relative to the fuel outlet 28 as illustrated in the drawings. The WIF sensor 25 which provides an indication of the fluid conductivity in the water collection space also serves as a closing plug for the corresponding port in the housing. Sensor 25 is threaded into connection port 51 with a liquid-tight assembly, assisted by O-ring 59. In the event an upstream fuel diagnosis is desired, the WIF sensor 25 can be removed for this purpose. Consequently, a single connection port 51 is used for two functions. This technique eliminates the need to machine a second connection port to provide the upstream fuel diagnosis. Likewise, since the WIF sensor 25 is indirectly used as a liquid-tight plug for the connection port, no additional plug is required.

The flow of fuel into filter 20 begins with fuel entry by way of the fuel inlet (port) 27. As will be described in greater detail hereinafter, the heater ring 30 is positioned adjacent to the fuel inlet port 27. The design of the heater ring is such that the entering fuel must first work its way through and around the heater ring 30 before it is able to feed into the annular clearance space 63. Picking the description up from this point, the fuel which flows from the heater ring into the annular clearance space 63 then flows around the filter cartridge 64 and is allowed to pool in collection area or space 65. Water collection space 65 is adjacent to the closed base 21a and is in flow communication with drain valve 24. The fuel flows radially inwardly into and through the filter cartridge 64, entering from the outer wall 66 and exiting by way of the inner wall 67 into interior space 68. The filter cartridge 64 is separately illustrated in FIG. 13. Inner wall 67 abuts up against rigid, hollow and substantially cylindrical centertube 71 for the filter cartridge 64 which includes a series of flow openings 71a. A permanent centertube 69 which is securely threaded into stem 56, is injection molded with a dome-like contour at its upper end 69b. This particular design is helpful in keeping dirty fuel out. Centertube 69 is hollow in order to serve as the flow conduit and has two fuel entrance apertures 70 which are located in the upper end of centertube 69. Fuel flowing through the filter element 72 of cartridge 64 and entering the interior space 68 flows into apertures 70 and by way of the hollow interior 69a of centertube 69, the fuel flows into stem 56 and from there out through fuel outlet (port) 28.

Figure 14:
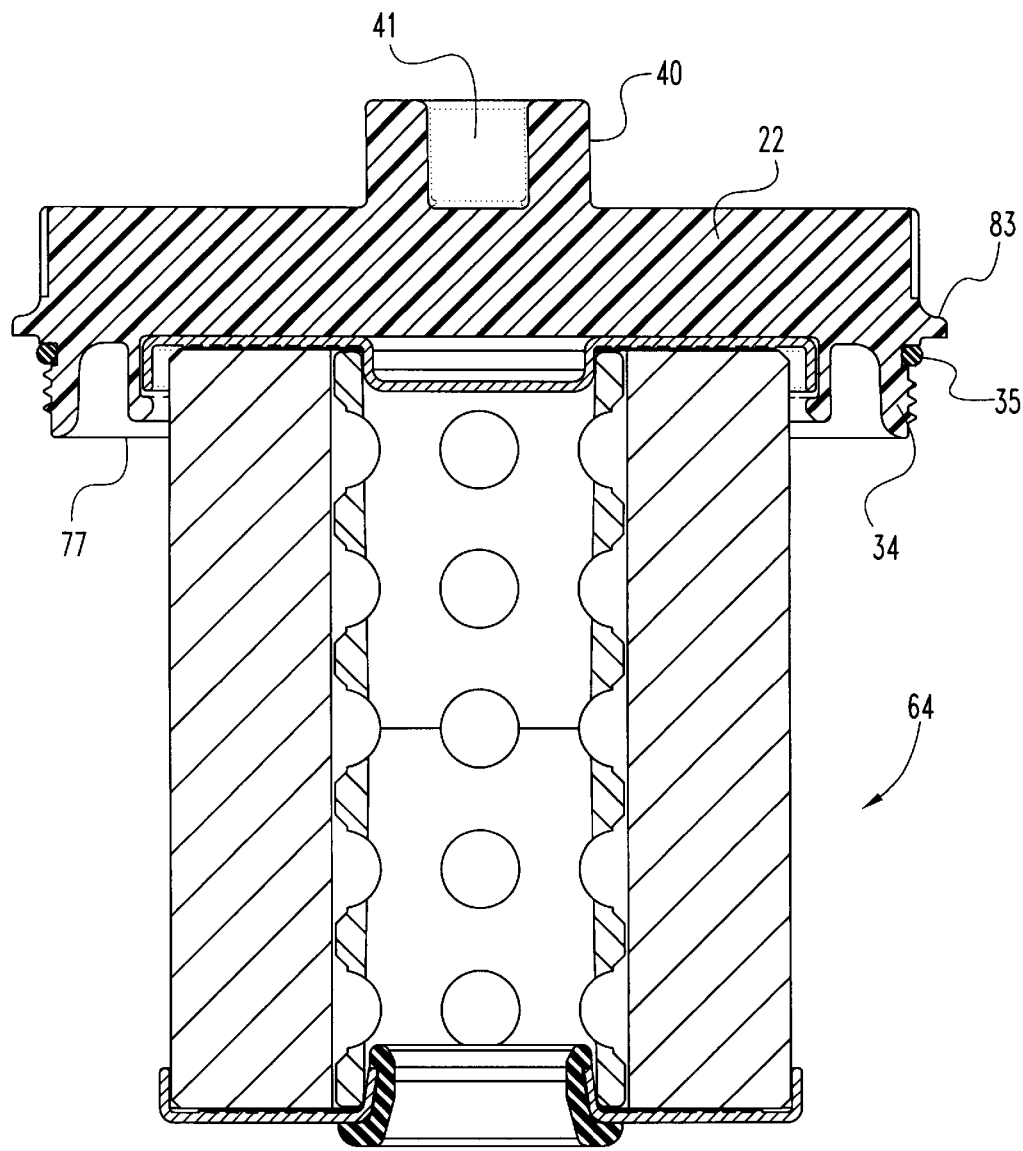
FIG. 14 is a front elevational view in full section of a lid snapped onto the FIG. 13 filter assembly according to the present invention.
Figure 15:
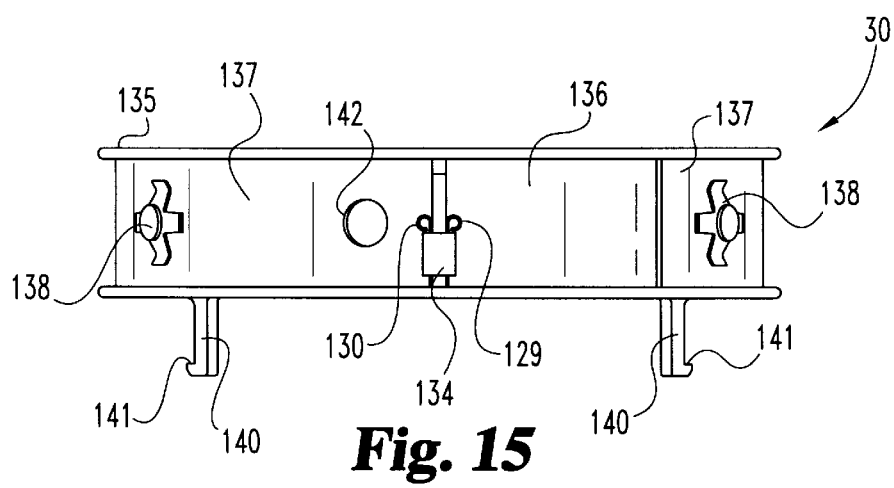
FIG. 15 is a front elevational view of a heater ring comprising a portion of the FIG. 1 fuel filter.
Figure 16:
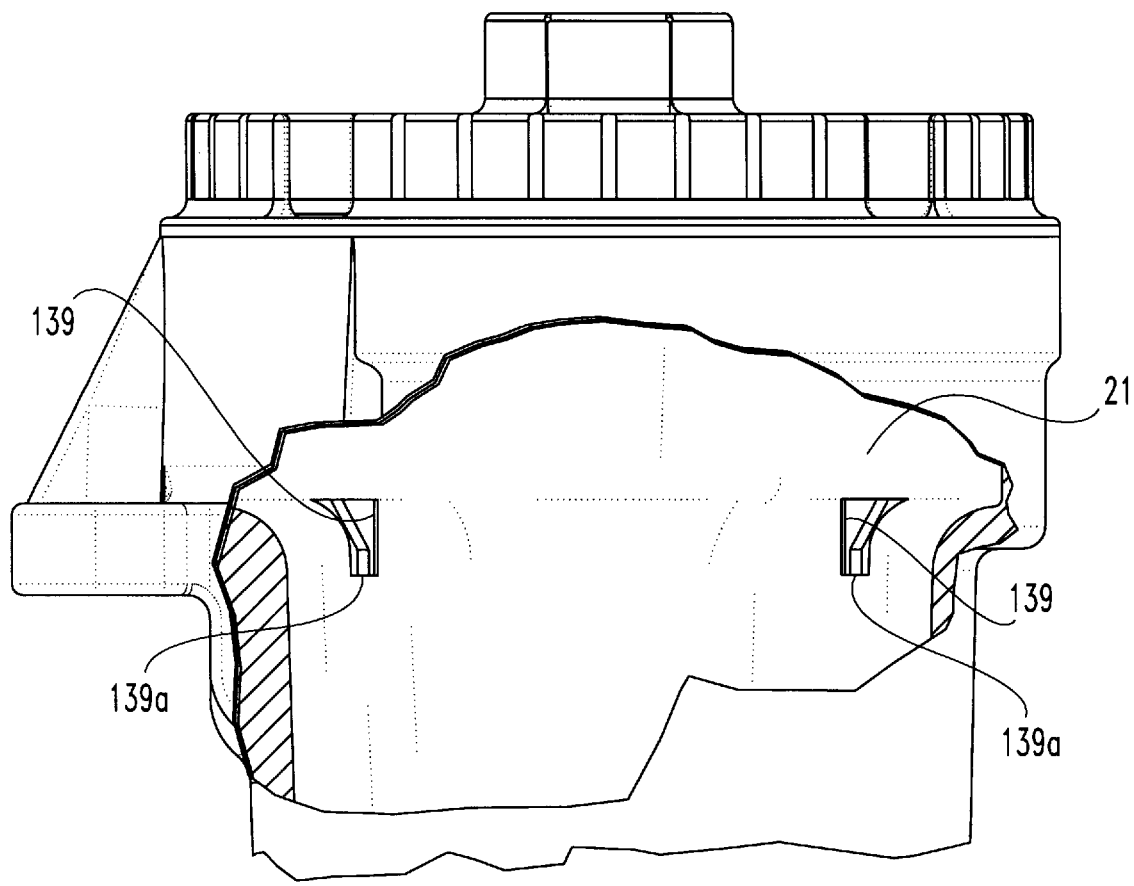
FIG. 16 is a partial front elevational view of the interior of the main housing of the FIG. 1 fuel filter.

The upper end of the filter cartridge 64 is arranged with a substantially circular top plate 75 which is securely bonded to and across the upper end of the filter element 72. Top plate or top endplate 75 seals over the upper end of the filter element in order to prevent the flow of any fuel out the end of the filter element 72. The center of top endplate 75 is solid so as to close off the hollow interior 68 and thereby prevent any bypass flow of fuel out the top end of centertube 71. Top endplate 75 is oversized in its outside diameter dimension in order to provide a retaining lip 76 for snap-fit assembly with an annular array of downwardly extending fingers 77 which are configured so as to simulate an inner wall of lid 22. The snap-fit assembly of the lid fingers 77 onto the oversized top endplate 75 is illustrated in FIG. 14. This inner wall or array of downwardly extending fingers 77 are sized and arranged to snap around and over the underside retaining lip 76 as a means of holding the filter cartridge 64 to the lid 22 which in turn facilitates the assembly of the filter cartridge 64 into the main housing 21. The lower end of the filter cartridge 64 is arranged with a bottom endplate 78 which has an annular ring shape and which is bonded over and around the lower end of filter element 72. The use of bottom endplate 78 seals the end of filter element 72 so that there is no fuel flow leakage out the end of the filter element, thereby ensuring that all of the fuel entering the filter element 72 by way of the outer wall 66 will ultimately flow through the element (not out the ends) exiting into the interior space 68. Bottom endplate 78 is oversized on the inner edge 79 in order to create clearance for the inner wall 67 and centertube 71. This inner edge 79 receives an annular gasket 80. The annular gasket 80 is securely attached to edge 79 and is designed and constructed to seal against the outer surface of centertube 69 and against the upper annular edge of stem 56.

The assembly technique for filter cartridge 64 involves first snapping the lid 22 onto the top endplate 75 of the filter cartridge 64. This snap-fit assembly is achieved by pressing the individual snap-fit fingers 77 over and around the lower edge 76 of the top endplate. The filter cartridge 64 is preassembled at this point in the process. The permanent centertube 69 is also already securely threaded into position in stem 56. The lid 22 and filter cartridge 64 combination is then threaded into the main housing 21. As the lid is tightened into position, flange 83 on the lid 22 is drawn into abutment against the upper surface 84 of the main housing 21. The O-ring 35 completes the sealed interface. The abutment of flange 83 onto surface 84 helps to control the degree of engagement and the degree of compression of annular, elastomeric gasket 80 which is attached to and around the inside diameter edge of bottom plate 78.

The drain valve 24 (see FIG. 12) includes a main body 86a and mounting bracket 86b combination with an integral (unitary) drain valve barb 87 at the lower end. A spring-biased plunger 88 is disposed in the main body 86a and is designed to seal against the lower end 89 which is adjacent the drain outlet 90 extending through the drain valve barb 87. Handle 91 is pinned to the upper end of the plunger 88. Handle 91 includes a cam surface 92 which acts against the top of threaded cap 93 in order to lift the plunger and open an exit path through the drain outlet 90. The geometry of the cam surface 92 on handle 91 is such that when fully rotated into a valve-open condition, will actually pass over center and can effectively lock in that position, thereby simplifying the draining process.

As has been previously described, the higher density water collects below the fuel in collection space 65. When the water level is relatively low, there is no urgency nor any real need at that point to drain the water from the filter housing. In this condition, the two contacts of the WIF sensor will contact fuel and will have a particular conductivity reading. As the water level increases to the point that water bridges the connection between the two contacts of the WIF sensor, a different conductivity reading will be provided. This alerts the operator to the fact that it is advisable to drain the water from the collection space 65. The draining procedure is easy because the handle 91 is accessible from the top of the filter and can be easily lifted and maintained in that position until manually returned, assisted by the biasing spring. Four mounting screws attach the mounting bracket 86b to the main housing by means of internally-threaded bores in the body of the housing. Flow communication between the collection area 65 and the drain valve 24 is established by two passages 96 and 97 which are initially closed off by the position of plunger 88. When the lever end 98 of handle 91 is lifted up, the plunger is raised, (i.e., retracted) and the spring 99 is compressed. This raises the plunger a distance which is sufficient for the end of the plunger to clear the lower passage 97 and permit the liquid contained in the collection area to be drained by way of the drain outlet 90. The upper passage 96 provides an entrance permitting air to enter the collection area 65. Bore 100 in the main body 86a provides an air inlet for air to enter the drain valve. Various O-rings are provided in order to seal the interface between the drain valve 24 and the main housing 21 and to seal the movement of the plunger 88 on the interior of the main body 86a of the drain valve.

The water-in-fuel (WIF) sensor 25 is basically a connector which has a hex flange 104, an undercut portion 105, and a receptacle 106 which houses two contact terminals 107 and 108. The portion of the sensor 25 which is threaded into housing bore 51 includes two contacts 112 and 113 which are effectively an extension of contact terminals 107 and 108, respectively. As water gradually collects in collection space 65, it will displace the fuel. Over time, the volume of water will increase to the point that the water level comes in contact with contacts 112 and 113, providing an indication of the conductivity. Electrically, this level of conductivity is sensed and monitored. When the electrical bridge between contacts 112 and 113 is made by water in lieu of fuel, the change in conductivity provides a signal to the vehicle operator, indicating that it is time to drain the collection space 65 of water by means of drain valve 24.

The heater connector/thermostat assembly 26 (see FIGS. 10 and 11) includes a housing 118 which is mounted to the main housing 21 by two mounting screws. The main housing is formed with a raised, oblong portion 119 which is open into the interior of the main housing 21. Each side of this oblong portion 119 includes an internally-threaded bore which receives one of the two mounting screws. The housing 118 includes a control portion 120 and a connector portion 121. The connector portion 121 includes two contact terminals 122 and 123 which establish the electrical connection between the heater connector/thermostat assembly 26 and an external source of power, typically a 12 volt supply.

Within the control portion 120 there is a connector plug 126 which abuts up against the oblong portion 119. Plug 126 includes two electrical contacts 127 and 128 which are inserted into receiving sockets 129 and 130, respectively, which are part of heater ring 30 (see FIGS. 9 and 15). Also positioned in portion 120 and wired in series with contact terminals 122 and 123 and with electrical contacts 127 and 128, is a thermostat 131. The thermostat 131 includes a metal cap 132 which is placed in direct contact with a machined surface (circular) in the oblong portion 119. This contact with the main housing 21 provides temperature feedback to the thermostat as to the temperature of the filter housing in the vicinity of the heater ring 30. A temperature in excess of the set limit for the thermostat causes the thermostat to open, thereby creating an open circuit and shutting off the delivery of power to the heater ring 30.

The heater ring 30 receives its electrical power from the heater connector/thermostat assembly 26 by way of the two electrical sockets 129 and 130. An annular plastic spool 135 provides the support member for the heater ring. Wrapped around the spool are two metal (heat conductive) bands 136 and 137. There is an inner metal band 136 in electrical contact with one socket 130. This inner band extends around the inner hub of the spool 135 for approximately 300 degrees. The outer metal band 137 is in electrical contact with the other socket 129 and extends around the spool for approximately 300 degrees. The two sockets 129 and 130 are spaced apart from each other by an insulative divider 134.

The two metal bands are spaced apart at four locations by positive-temperature-coefficient (PTC) heater stones 138. The arrangement of the two metal bands relative to each other and relative to the plastic spool causes the entering fluid to flow through a circulate maze such that the fuel flows across the PTC stones 138 twice.

The interior of the main housing includes at two spaced-apart locations anti-rotation ribs 139 in combination with a recessed pocket 139a which is located directly beneath each rib. Cooperating with each rib/pocket combination is a snap-in finger or tab 140 which is integrally molded as part of the plastic spool which provides the support foundation for the heater ring. Each snap-in tab 140 extends in a downward direction towards the closed base of the main housing 21 from a lower inner edge of the plastic spool 135. Each tab 140 includes an offset, ratchet tip 141 which is designed to lock into a corresponding one of the recessed pockets 139a in order to prevent pull out of the heater ring. By placing each tab 140 on the outside of each rib 139, the heater ring 30 is unable to be turned in either a clockwise or a counterclockwise direction without one of the two tabs abutting up against one of the two anti-rotation ribs 139. The pair of molded snap-in tabs are spaced apart from each other with a separation distance of approximately 110 degrees. The heater ring 130 is aligned relative to the ribs 139 so that as the heater ring is pushed into the main housing 21, the two tabs 140 slide into position adjacent their corresponding ribs and when inserted downwardly far enough into the main housing, the ratchet tip of each tab snaps into the recessed pocket, signifying that the heater ring 30 is properly positioned.

As fuel enters the housing 21 by way of fuel inlet port 27, it will first encounter a portion of the outer metal band 137 of the heater ring 30. Since the annular ends of the plastic spool on each side of the center hub have a line-to-line fit with the inside surface of the main housing 21, the only path for the entering fuel to follow is across the surface of the outer metal band and between the metal band and the inside surface of the housing and between the upper and lower annular ends of the plastic spool. Since the fuel inlet location is approximately 180 degrees from the heater connector/thermostat assembly location, the entering fuel is able to flow in both a clockwise as well as a counterclockwise direction toward the two heater ring sockets 129 and 130. The insulator 134 which is positioned between the two sockets creates a flow barrier due to its line-to-line fit against the inside surface of the main housing. This in turn causes the two paths of fuel flow to reverse their directions. One flow path flows back between the inner and outer metal bands 136 and 137 on one side of the insulator. On the opposite side of the insulator, a clearance hole 142 is provided in the outer band to accept the reversing flow of fuel. In the reverse flow direction, the fuel finds its way into the hollow interior of the spool. Five oblong apertures in the inner wall of the spool hub are provided for the flow of pre-heated fuel into the annular clearance space. The fuel is then filtered and exits by way of the fuel outlet.

What is created by the present invention is a fuel filter with a number of unique design features and a fuel filter with a unique combination of features. The housing is designed (i.e., one casting), with a unitary mounting bracket which provides a compact design and a design which is durable. By casting a plurality of ports and apertures in the housing, it is easy and efficient to assemble a water-in-fuel sensor, a heater connector/thermostat assembly, a drain valve, a diagnostic plug, and any necessary inlet and outlet tubes.

By bringing the fuel in from the top and by providing a water collection space at the bottom, a highly efficient water-fuel separation path is provided. Further, access to the filter element is provided from the top of the unit for efficient servicing. Access to the drain valve handle is also provided from the top of the unit to make this task easy to perform. The heater ring is shaped in an annular form surrounding the filter cartridge. This enables an efficient fuel pre-heat and the repetitive or reversing flow path creates a time delay so as to adequately heat the fuel in a thorough and efficient manner. The heater ring includes two snap tabs for ease of assembly and the PTC stones help to maintain and control the desired temperature.

The drain valve design is one of low cost and high reliability due to the use of a spring-biased plunger. The cam mechanism enables easy opening and provides an open-position lock for easy draining of the water which has been collected near the bottom of the housing. Venting is provided by an internal path through the drain valve.

The lid design and its snap-fit assembly onto the top end cap of the filter cartridge creates a package which is easy to service. There is only one O-ring seal on the lid to simplify servicing and increase reliability. The filter element centertube is designed so as to be molded in a two-direction injection mold with ribs 71B to increase the flow path and provide strength. There are a plurality of flow openings 71a located around the centertube 71 between each pair of adjacent ribs 71b, such that in the axial direction the plurality of flow openings 71a alternate with the ribs 71b. The permanent centertube is injection molded with a dome-like geometry on top in order to keep out dirty fuel. The WIF sensor is installed in a machined port which doubles as an upstream diagnostic port. This approach eliminates the need for a separate plug and eliminates the machining of one port into the main housing 21.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel filter constructed and arranged for fuel-water separation, said fuel filter comprising:

a unitary housing having an open top and a closed base and therebetween a sidewall which in combination with said closed base defines a hollow interior space;

a fuel filter cartridge disposed in said interior space, said fuel filter cartridge including a filter element, a top endplate, and a bottom endplate, said top and bottom endplates being bonded to opposite ends of said filter element, said bottom endplate being spaced from said closed base;

a lid constructed and arranged for threaded attachment to said housing for closing said open top;

a heater ring mounted into said housing and positioned around said filter cartridge, said heater ring including a plurality of PTC stones and defining an initial flow path for entering fuel and means for mounting said heater ring to said housing comprising a pair of snap-in fingers and said unitary housing defining a pair of receiving recesses for fixedly receiving said pair of snap-in fingers;

a heater connector arranged in electrical contract with said heater ring;

a drain valve mounted to said housing and defining a passage which is in flow communication with the hollow interior space of said housing; and a water-in-fuel sensor mounted to said housing and being constructed and arranged for deriving conductivity readings.

2. A fuel filter constructed and arranged for fuel-water separation, said fuel filter comprising:

a unitary housing having an open top and a closed base and therebetween a sidewall which in combination with said closed base defines a hollow interior space, the base of said housing including a support post extending into said interior space in the direction of said open top;

a fuel filter cartridge disposed in said interior space, said fuel filter cartridge including a filter element, a centertube, a top endplate, and a bottom endplate, said top and bottom endplates being bonded to opposite ends of said filter element, said bottom endplate being spaced from said closed base;

a unitary lid constructed and arranged for threaded attachment to said housing for closing said open top and including a plurality of snap-fit fingers for press-on attachment to said top endplate;

a heater ring mounted into said housing and positioned around said filter cartridge, said heater ring including a plurality of PTC stones and defining an initial flow path for entering fuel and means for mounting said heater ring to said housing comprising a pair of snap-in fingers and said unitary housing defining a pair of receiving recesses for fixedly receiving said pair of snap-in fingers;

a heater connector arranged in electrical contact with said heater ring and including a thermostat wired in series to control the delivery of power to said heater ring;

a drain valve mounted to said housing and defining a passage which is in flow communication with the hollow interior space of said housing; and a water-in-fuel sensor mounted to said housing and being constructed and arranged for deriving conductivity readings.

3. A fuel filter constructed and arranged for fuel-water separation, said fuel filter comprising:

a unitary housing having an open top and a closed base and therebetween a sidewall which in combination with said closed base defines a hollow interior space;

a fuel filter cartridge positioned in said hollow interior space;

a lid constructed and arranged for closing said open top; and a heater ring mounted into said housing and positioned around said filter cartridge, said heater ring including means for mounting said heater ring to said housing, said means for mounting comprising a pair of snap-in fingers and said unitary housing defining a pair of receiving recesses for fixedly receiving said pair of snap-in fingers.

4. A fuel filter comprising:

a housing having an open top and a closed base and a sidewall surrounding a central axis and extending axially from the open top to the closed base, said closed base and said sidewall defining a hollow interior region, said sidewall defining a fuel inlet port;

a lid constructed and arranged for closing said open top;

a fuel filter cartridge positioned in said hollow interior region and enclosing an interior space, said fuel filter cartridge having an outer peripheral surface spaced apart from said sidewall to define an annular clearance space with said sidewall;

conduit means for fluidly connecting the interior space of said filter cartridge to a fuel outlet port; and a heater ring assembly positioned around the outer peripheral surface of said fuel filter cartridge in said annular clearance space, said heater ring assembly including a spool having a cylindrical wall positioned adjacent the outer peripheral surface of said fuel filter cartridge and upper and lower flanges which abut the sidewall of said housing to define an annular flow space therewith, wherein said fuel inlet port extends through said sidewall into said annular flow space, a plurality of PTC stones disposed within said annular flow space, and metal band means disposed within said annular space for electrically connecting said plurality of PTC stones to an electrical power source, wherein said spool and said metal band means are configured and arranged to define first and second fuel passageways within said annular flow space, said first fuel passageway extending from said fuel inlet port around a first portion of said annular flow space and into said clearance space through a first discharge opening in the cylindrical wall of said spool, said second fuel passageway extending from said fuel inlet port around a second portion of said annular flow space and into said clearance space through a second discharge opening in the cylindrical wall of said spool.

5. The fuel filter of claim 4 wherein said conduit means includes a support post extending from said closed base into the interior space of said filter cartridge in a direction toward the open top of said housing.

6. The fuel filter of claim 5 which further includes a connector arranged in electrical contact with said metal band means for connecting said metal band means to said electrical power source.

7. The fuel filter of claim 6 which further includes a drain valve mounted to said housing and defining a passage which is in flow communication with the hollow interior region of said housing.

8. The fuel filter of claim 7 which further includes a water-in-fuel sensor mounted to said housing and being constructed and arranged for deriving conductivity readings.

9. The fuel filter of claim 8 which further includes a thermostat wired in series with said heater connector to control the delivery of power to said heater ring.

10. The fuel filter of claim 9 wherein the hollow interior region of said housing includes a water collection space which is adjacent said closed base, said drain valve being in flow communication with said water collection space.

11. The fuel filter of claim 10 wherein said housing is of a unitary construction and includes an integral mounting bracket for mounting said fuel filter to an engine block.

12. The fuel filter of claim 4 which further includes a connector arranged in electrical contact with said metal band means for connecting said metal band means to said electrical power source.

13. The fuel filter of claim 4 which further includes a drain valve mounted to said housing and defining a passage which is in flow communication with the hollow interior region of said housing.

14. The fuel filter of claim 13 wherein the hollow interior region of said housing includes a water collection space which is adjacent said closed base, said drain valve being in flow communication with said water collection space.

15. The fuel filter of claim 4 which further includes a water-in-fuel sensor mounted to said housing and being constructed and arranged for deriving conductivity readings.

16. The fuel filter of claim 4 wherein said housing is of a unitary construction and includes an integral mounting bracket for mounting said fuel filter to an engine block.

* * * * *